(12) United States Patent
Puvvada et al.

(10) Patent No.: US 7,603,531 B2
(45) Date of Patent: Oct. 13, 2009

(54) USE OF A SHUTDOWN OBJECT TO IMPROVE INITIALIZATION PERFORMANCE

(75) Inventors: Vinod K. Puvvada, Folsom, CA (US); Neil A. Gabriel, Santa Clara, CA (US); Suresh Nagarajan, Mather, CA (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 11/689,968

(22) Filed: Mar. 22, 2007

(65) Prior Publication Data
US 2008/0235435 A1    Sep. 25, 2008

(51) Int. Cl.
*G06F 12/00* (2006.01)
(52) U.S. Cl. .................................. 711/165
(58) Field of Classification Search ........ None
See application file for complete search history.

(56) References Cited

U.S. PATENT DOCUMENTS

| 5,787,466 | A  | * | 7/1998 | Berliner ..................... 711/117 |
| 7,000,075 | B2 | * | 2/2006 | Beckert et al. ............. 711/133 |
| 7,231,436 | B1 | * | 6/2007 | Dalfo et al. ................. 709/223 |

* cited by examiner

*Primary Examiner*—Hiep T Nguyen
(74) *Attorney, Agent, or Firm*—Trop, Pruner & Hu, P.C.

(57) ABSTRACT

According to some embodiments, use of a shutdown object during system initialization is disclosed. The shutdown object may be read from a non-volatile memory device and loaded into a random access memory. A plurality of headers may then be scanned from the non-volatile memory device. The shutdown object may be referenced to determine whether each of the plurality of headers includes valid data. Each of the plurality of headers that includes valid data may be represented in the random access memory.

12 Claims, 3 Drawing Sheets

USE OF A SHUTDOWN OBJECT TO IMPROVE INITIALIZATION PERFORMANCE

BACKGROUND

During a file system initialization process, valid data may be identified and distinguished from invalid data. For file systems that distinguish valid data from invalid data in RAM (random access memory), it is necessary to process and compare all data during initialization. This process can be both time consuming and memory intensive, as both valid and invalid data must be loaded into RAM before the invalid data space is subsequently freed.

BRIEF DESCRIPTION OF THE DRAWINGS

A better understanding of embodiments of the present invention can be obtained from the following detailed description in conjunction with the following drawings, in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiments of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

Various embodiments of the invention may be implemented in one or any combination of hardware, firmware, and software. Embodiments may also be implemented as instructions contained in or on a computer readable medium, which may be read and executed by one or more processors to enable performance of the operations described herein. A computer readable medium may include any mechanism for storing, transmitting, and/or receiving information in a form readable by a machine (e.g., a computer). For example, a computer readable medium may include a storage medium, such as but not limited to read only memory (ROM); random access memory (RAM); magnetic disk storage media; optical storage media; a flash memory device, etc. A computer readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

Figure 1:
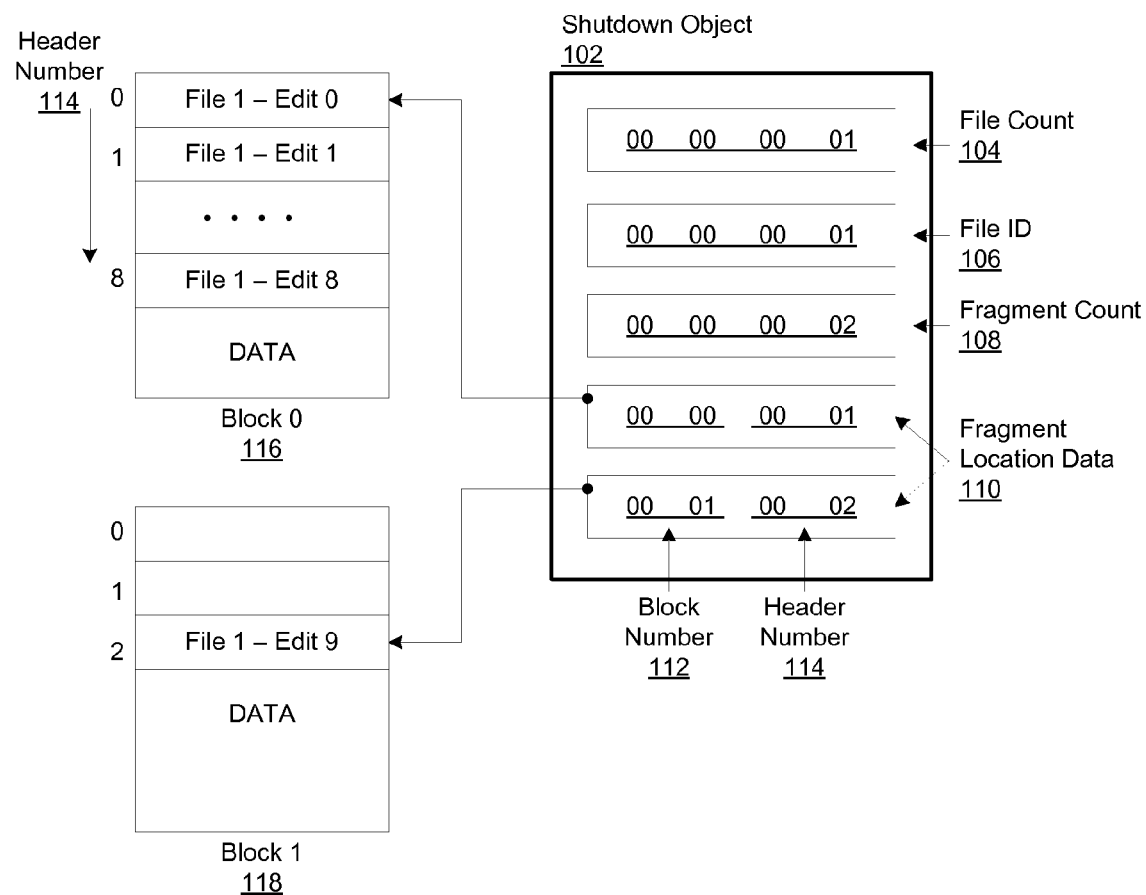
FIG. 1 is an illustration of a shutdown object and physical representation of file fragments in a flash memory device according to some embodiments.

FIG. 1 is an illustration of a shutdown object and physical representation of file fragments in a non-volatile memory device according to some embodiments. The shutdown object (102) is stored in a non-volatile memory device, such as flash memory, and is used to retain the information necessary to distinguish valid file fragments from invalid file fragments upon initialization of a filesystem. The shutdown object (102) may be created and written to the non-volatile memory device during a shutdown or unmount process of a filesystem. The shutdown object may then be used during the next filesystem initialization.

The shutdown object (102) may include a file count (104), file identifiers for all valid files (106), a total fragment count (108), and locations for all valid fragments (110). The fragment location data (110) includes a block number (112) and header number (114) for each valid fragment. The shutdown object (102) may also include one or more shutdown object state bits to indicate whether or not the shutdown object is valid, and/or other shutdown object state information.

The file count (104) of the shutdown object (102) indicates that one valid file exists in the non-volatile memory device. The file identifier (ID) (106) of the valid file is "01." The valid file includes two valid fragments, as indicated by the fragment count (108). The fragment location data (110) lists the block number (112) and header number (114) for each of the two valid fragments. In this example, one valid fragment is located in block 0 (116), header number 1, and the other valid fragment is located in block 1 (118), header number 2. In this example, the two valid file fragments are File 1-Edit 0 and File 1-Edit 9. The remaining file fragments (e.g., File 1-Edit 1 through File 1-Edit 8 in Block 0, Headers 1-8) in the non-volatile memory device are invalid. Invalid fragments File 1-Edit 1 through File 1-Edit 8 may be invalid, and thus do not exist in the shutdown object (102), because, for example, they are all replaced by valid File 1-Edit 9.

The size of the shutdown object in flash memory may be dependent on the number of files and/or valid file fragments in the flash volume. The shutdown object may span one or more blocks in memory. The number of blocks that the shutdown object can span may be user configurable. Thus, the shutdown object may be utilized in different types of flash memory, regardless of the flash block size.

Figure 2:
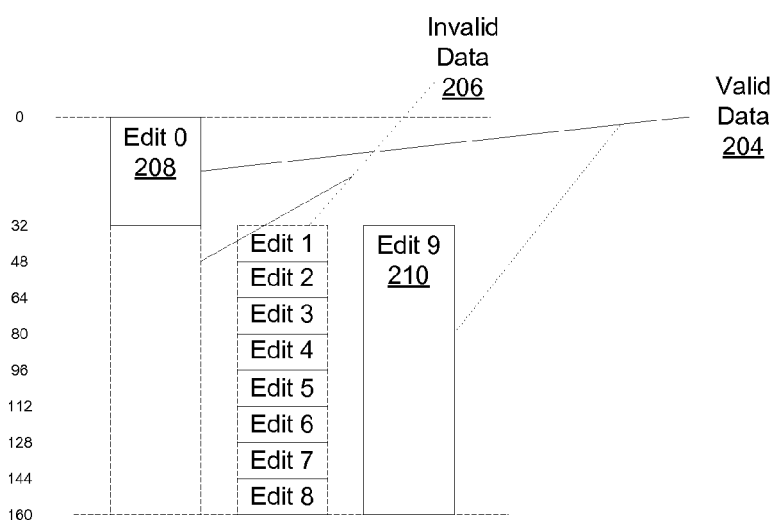
FIG. 2 is an illustration the logical representation of file fragments in a random access memory according to some embodiments.

FIG. 2 is an illustration of a logical file view of the contents of a random access memory (RAM) after system initialization. Upon initialization, the shutdown object of FIG. 1 (102) will be loaded into RAM. Based on the contents of the shutdown object, only the valid file fragments will be represented in RAM. The invalid file fragments will not be represented in RAM. Thus, because the shutdown object (102) indicates that File 1-Edit 0 is valid, it will be loaded into RAM from the non-volatile memory. The Edit 0 file fragment (208) will thus be represented in RAM. The shutdown object (102) does not indicate that Edits 1-8 are valid. Edits 1-8 may have been, for example, replaced by Edit 9. Thus, these fragments are invalid (206), and are not represented in RAM. The shutdown object (102) also indicates that File 1-Edit 9 is valid, and thus, Edit 9 (210) will be represented in RAM. By cross referencing the data in the non-volatile memory with the contents of the shutdown object, only valid data (204) will be represented in RAM, while invalid data (206) will not be represented in RAM.

In some embodiments, if a valid shutdown object does not exist upon filesystem initialization, all valid and invalid fragments (e.g., Edits 0 through Edit 9) would be represented in RAM. Subsequently, comparison and sorting may be performed in order to free the RAM structures representing invalid data (e.g., Edits 1-8).

Figure 3:
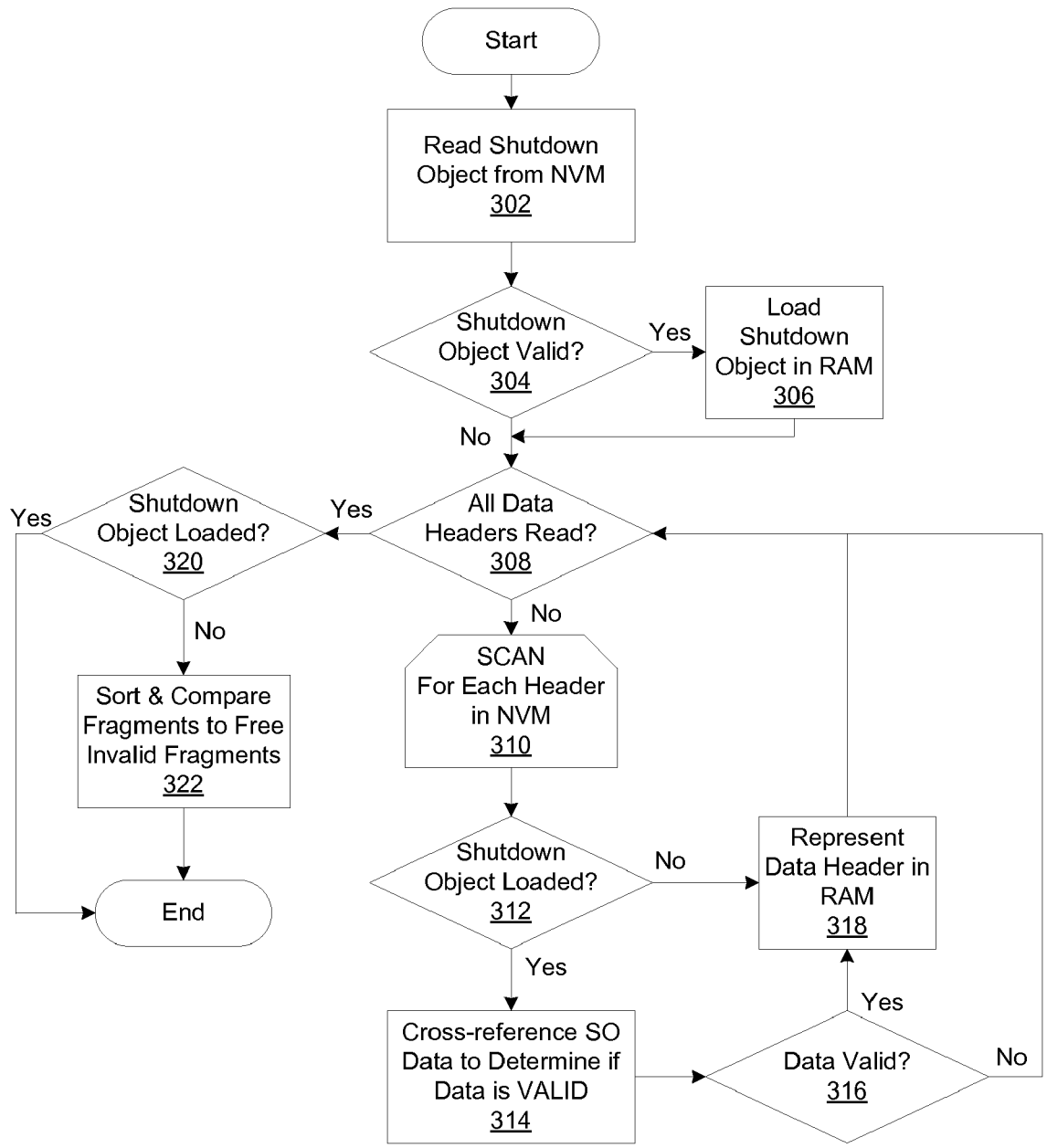
FIG. 3 is a flow diagram illustrating a file system initialization sequence according to some embodiments.

FIG. 3 is a flow diagram illustrating a file system initialization sequence according to some embodiments. Upon initialization of a file system, the shutdown object will be read from the non-volatile memory (NVM) (302). A determination may be made whether the shutdown object is valid (304). State bits in the shutdown object may indicate whether the shutdown object is valid or not. If the shutdown object is valid, it will be loaded into a random access memory (RAM) (306). If the shutdown object is not valid, it will not be loaded into RAM, and system initialization will proceed without using the shutdown object.

Next, the data headers will be read (308). Each of a plurality of data headers in the NVM will be scanned (310). For each data header, if the shutdown object is loaded (312), the shutdown object will be referenced to determine if the data header refers to valid data (e.g. a valid file or file fragment) (314). If the data header refers to valid data (316), then the data header will be represented in RAM. If the data is not valid, it will not be represented in RAM. However, if the shutdown object was not loaded (312), then all data headers will be represented in RAM (318).

After each of the plurality of data headers in the NVM has been read (308), if the shutdown object was loaded (320) no further processing will be necessary. At this point, the RAM structures will only refer to valid fragments. However, if the shutdown object was not loaded (320), then every data fragment from the NVM will be temporarily represented in the RAM. These fragments must then be sorted and compared (322). As a result of the sorting and comparison, all fragments determined to be invalid may be freed in the RAM (322).

Thus, if a valid shutdown object exists and is loaded into RAM, invalid fragments are distinguishable from valid fragments based on the contents of the shutdown object. The shutdown object may be referenced during initialization so that only valid fragments may be loaded into RAM. This may improve initialization performance because allocation and de-allocation of RAM is not necessary for invalid fragments. Additionally, comparison and sorting of fragments may not be necessary after only the valid fragments have been stored in RAM.

Figure 4:
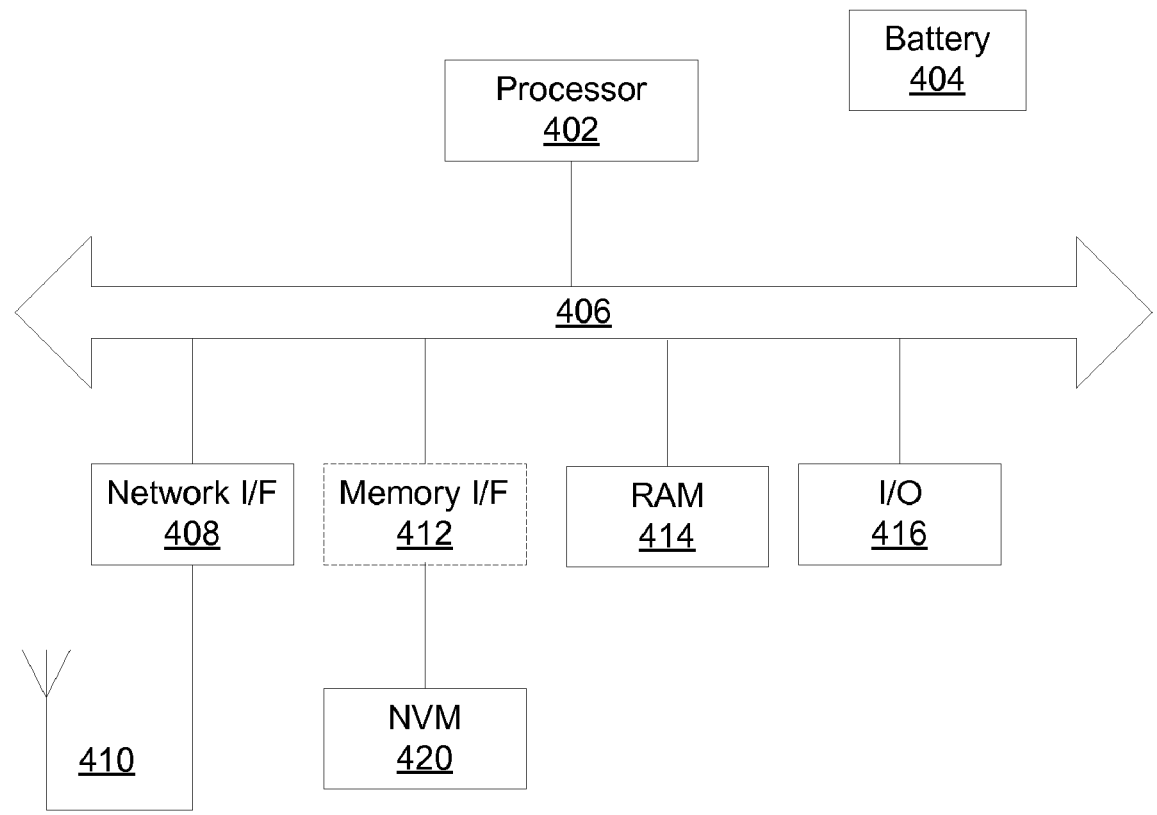
FIG. 4 is a block diagram of a system according to some embodiments.

In various embodiments, the technique of FIG. 3 may be implemented as a sequence of instructions executed by one or more electronic systems. The instructions may be stored by the electronic device or the instructions may be received by the electronic device (e.g., via a network connection). FIG. 4 is a block diagram of such an electronic system according to some embodiments. The electronic system illustrated in FIG. 4 is intended to represent a range of electronic systems, for example, computer systems, PDAs, cellular telephones, etc. Alternative systems may include more, fewer and/or different components.

The system may include a processor (402) which communicates via an interconnect (406). The processor (402) may be a microcontroller, one or more microprocessors, each of which may include one or more cores, a digital signal processor (DSP), or another type of controller. The system may be powered by a battery (404) or may be powered with another power source, such as AC power.

A variety of input/output (I/O) devices (416) may be coupled to the interconnect (406). The I/O devices may include items such as a display, keyboard, mouse, touch screen, or other I/O devices.

The system may further include one or more network interface(s) (408) to provide access to a network, such as a local area network. Network interface(s) may include, for example, a wireless network interface having an antenna (410), which may represent one or more antenna(e), such as, for example, a dipole antenna. In some embodiments, the network interface(s) (408) may provide access to a local area network, for example, by conforming to IEEE 802.11b and/or IEEE 802.11g standards, and/or the wireless network interface may provide access to a personal area network, for example, by conforming to Bluetooth standards. In addition to, or instead of, communication via wireless LAN standards, the network interface(s) (408) may provide wireless communications using, for example, Time Division Multiple Access (TDMA) protocols, Global System for Mobile Communications (GSM) protocols, Code Division Multiple Access (CDMA) protocols, and/or any other type of wireless communications protocol.

The system also includes a non-volatile memory device (420). The non-volatile memory device may be, for example, a NAND or NOR flash memory device. The non-volatile memory device (420) may be built into the system, or may be part of a removable storage medium, such as a card form factor, that may be inserted into an optional memory card interface (412) or other type of interface.

The system may further include random access memory (RAM) or other dynamic storage device (414), coupled to the interconnect (406) to store information and instructions to be executed by the processor (402). The RAM (414) also may be used to store temporary variables or other intermediate information during execution of instructions by the processor (402).

Instructions may be provided to memory from a storage device, such as non-volatile memory (420). In other embodiments, instructions may be provided by another type of storage device, such as, a magnetic disk, a read-only memory (ROM) integrated circuit, CD-ROM, DVD, via a remote connection (e.g., over a network via network interface 408) that may be either wired or wireless providing access to one or more electronically-accessible media, etc. In alternative embodiments, hard-wired circuitry may be used in place of or in combination with software instructions. Thus, execution of sequences of instructions is not limited to any specific combination of hardware circuitry and software instructions.

In some embodiments, upon system initialization, a shutdown object is read from the non-volatile memory device (420) and stored in the RAM (414). Using the shutdown object, valid data fragments in the non-volatile memory (420) are identified and loaded into RAM (414), as described above with respect to FIGS. 1-3. During run time, if a write occurs to the non-volatile memory (420), state bits within the shutdown object may be altered to indicate that the shutdown object is no longer valid. An invalid shutdown object may remain in the non-volatile memory until a garbage collection occurs. Upon system shutdown or filesystem unmounting, a new or updated shutdown object may be created and stored in the non-volatile memory (420).

Thus, the use of a shutdown object to improve initialization performance is disclosed in various embodiments. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method comprising:
   reading a shutdown object from a non-volatile memory device;
   loading the shutdown object into a random access memory;
   scanning a plurality of headers from the non-volatile memory device;
   referencing the shutdown object to determine whether each of the plurality of headers includes valid data; and
   representing each of the plurality of headers that includes valid data in the random access memory.

2. The method of claim 1, further comprising determining if the shutdown object is valid before loading the shutdown object into the random access memory.

3. The method of claim 1, wherein the shutdown object includes a list of valid files.

4. The method of claim 3, wherein the shutdown object further includes a number of total valid fragments and a block number and a header number for each valid fragment.

5. The method of claim 1, further comprising invalidating the shutdown object upon a write to the flash memory device.

6. The method of claim 1, further comprising creating the shutdown object during a shutdown process of a filesystem.

7. An article comprising a computer-readable medium having stored thereon instructions that, when executed, cause one or more processors to:
   read a shutdown object from a flash memory device;
   load the shutdown object into a random access memory;
   scan a plurality of headers from the flash memory device;
   reference the shutdown object to determine whether each of the plurality of headers includes valid data; and
   represent each of the plurality of headers that includes valid data in the random access memory.

8. The article of claim 7, wherein the instructions, when executed, further cause the one or more processors to determine if the shutdown object is valid.

9. The article of claim 7, wherein the shutdown object includes a list of valid files.

10. The article of claim 9, wherein the shutdown object further includes a number of total valid fragments and a block number and a header number for each valid fragment.

11. The article of claim 9, wherein the instructions, when executed, further cause the one or more processors to invalidate the shutdown object upon a write to the flash memory device.

12. The article of claim 9, wherein the instructions, when executed, further cause the one or more processors to create the shutdown object upon shutdown of a filesystem.

* * * * *